United States Patent [19]

Keur

[11] 3,972,474
[45] Aug. 3, 1976

[54] MINIATURE INK JET NOZZLE

[75] Inventor: Robert I. Keur, Niles, Ill.

[73] Assignee: A. B. Dick Company, Chicago, Ill.

[22] Filed: Nov. 1, 1974

[21] Appl. No.: 520,025

[52] U.S. Cl. .................................. 239/102; 346/75
[51] Int. Cl.² .......................................... B05B 17/06
[58] Field of Search ............. 239/3, 4, 15, 101, 102, 239/601, 602; 346/1, 75, 140

[56] References Cited
UNITED STATES PATENTS

| | | | |
|---|---|---|---|
| 3,281,860 | 10/1966 | Adams et al. | 346/140 X |
| 3,683,212 | 8/1972 | Zoltan | 346/75 X |
| 3,683,396 | 8/1972 | Keur | 346/1 |
| 3,717,875 | 2/1973 | Arciprete | 239/102 X |
| 3,823,408 | 7/1974 | Gordon | 239/601 X |

Primary Examiner—John J. Love
Attorney, Agent, or Firm—Lindenberg, Freilich, Wasserman, Rosen & Fernandez

[57] ABSTRACT

In an ink drop writing system a vibrating nozzle is used to form drops which are thereafter deflected electrostatically whereby characters or wave forms are written on paper by the deflected drops. In order to minimize the variations in drive voltage requirements for the transducer that vibrates the nozzle, caused by changes in ink parameters which cause variations in the velocity of sound through the ink that is used, and in order to minimize variations in the drop separation time from the ink stream, with drive frequency variations, the length of the nozzle is selected so that its mechanical resonance frequency is very much higher than the frequency at which the nozzle is used. As a result, the length of the nozzle is considerably shorter than the nozzle lengths which have been used heretofore.

5 Claims, 2 Drawing Figures

MINIATURE INK JET NOZZLE

BACKGROUND OF THE INVENTION

This invention relates to ink drop printing systems and more particularly to a method and means of making an improved nozzle to be used therein.

In a U.S. Pat. No. 3,683,396, there is described a method and means for designing a nozzle for an ink drop writing system. It was shown that in order to insure a most efficient transfer of power from the driving source into the drop forming mechanism, the nozzle had to be designed to provide a fluid resonance condition. If the nozzle is considered as a closed pipe, the frequency of vibration of the fluid in the pipe at which its length is an odd multiple of a quarter wave length of sound through the fluid in the pipe is the fluid resonance length and at this length results in the highest power transfer. The mechanical resonance frequency of the pipe turns out to be close to the fluid resonance frequency.

In order to stabilize the drop forming process, the variations in drive voltage requirements for the transducer that vibrates the nozzle for drop formation, must be minimized. Variations in drive voltage requirements occur usually due to variations in the acoustic coupling between the transducer and the fluid. Most nozzles make use of resonating fluid columns in order to couple energy into the fluid, but this method falters when fluid parameters change (such as temperature concentration, velocity of sound).

When a nozzle is designed to have a length at which fluid resonance occurs, it has been found that changes in the composition or temperature of the fluid throws the nozzle out of fluid resonance, thereby causing a considerable increase in the driving power required and also to a certain extent altering the location at which drop separation from the ink stream occurs. This latter phenomenon can be significant since it is necessary to apply a charge to the drops at the location at which drop separation from the ink stream takes place.

In a U.S. Pat. No. 3,771,568, it was shown that where ink is recirculated, in order to maintain the desired fluid resonance, it was necessary to compensate for the effects of evaporation on the ink parameters.

When the composition and temperature of the ink is controlled so that fluid resonance is maintained substantially constant, no problems are encountered. However, it has been found that this is easier said than done. Users of the equipment may purchase their ink supplies from different manufacturers and therefore the fluid resonance of the nozzle which has been designed for an ink for one particular type of manufacturer is not suitable for ink of another manufacturer. Unused ink drops which are fed back into a reservoir supplying ink to the nozzle may not be compensated for the effects of evaporation as effectively as they should be. As indicated, this can adversely affect the operation of the ink drop writing system.

OBJECTS AND SUMMARY OF THE INVENTION

An object of this invention is to provide a nozzle for an ink drop writing system with a construction which renders it substantially insensitive to the velocity of sound changes in ink.

Another object of this invention is the provision of a nozzle whose performance is substantially unchanged despite the changing ink parameters.

Yet another object of this invention is the provision of an improved construction for a nozzle used in an ink jet printing system.

These and other objects of the invention are achieved by determining the length of the nozzle so that its mechanical resonance frequency is well over 100 KHz and its fluid primary resonance frequency is at least 70 KHz or above. This may be contrasted with the present standard nozzles whose length is such that they are operated on a third harmonic fluid resonance frequency. The fundamental fluid resonance frequency is on the order of 23 KHz so that the third harmonic is on the order of 70 KHz.

In effect, with this invention, the length of the nozzle is selected so that its mechanical resonance frequency is very much higher than the operating frequency desired. Also, with consideration given to the length of the fluid chamber, this length is selected short enough so that its first fluid column resonance is high enough to exceed the operating frequency. As a result the nozzle is dependent upon neither mechanical or fluid resonances for its acoustic coupling to the stream. It is not sensitive to either changing fluid parameters or temperature.

The novel features of the invention are set forth with particularity in the appended claims. The invention will best be understood from the following description when read in conjunction with the accompanying drawings.

DESCRIPTION OF THE PREFERRED EMBODIMENT

Figure 1:
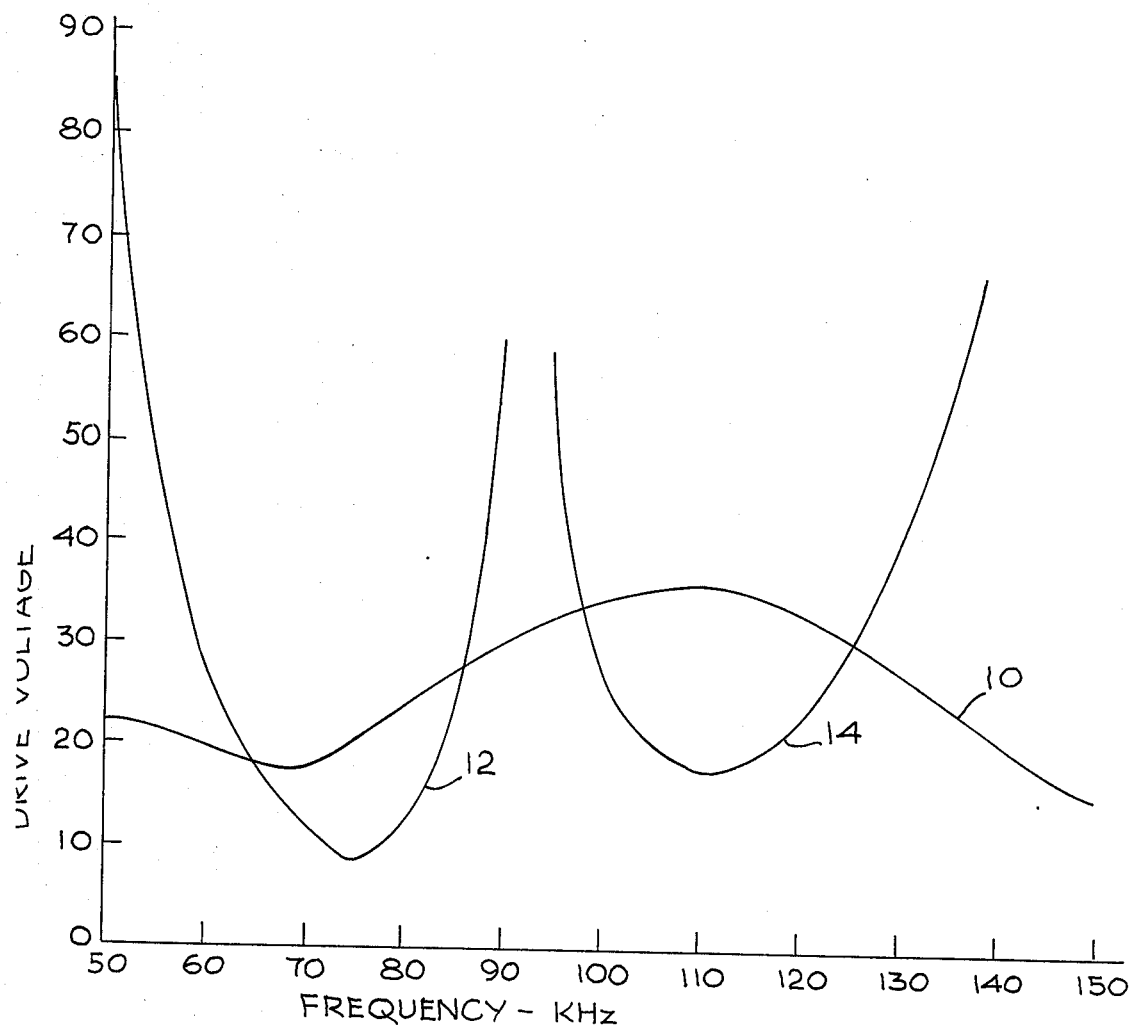
FIG. 1 is a graph illustrating the variations in drive voltages required versus nozzle frequency response for both the "standard" nozzle and nozzles made in accordance with this invention.

In FIG. 1, the curve 10 represents the drive voltage required over a range of frequencies from 50 to 145 KHz for a nozzle having dimensions in accordance with this invention. By way of illustration, the dimensions of the nozzle in accordance with this invention are selected to provide a first or fundamental fluid resonance at 70 KHz. A third harmonic is well above 150 KHz. Mechanical resonance will fall at about 250 KHz. The curve 12, 14 represents a curve derived from a standard nozzle which is usually designed for a fundamental harmonic resonance frequency at about 25 KHz. However, the standard nozzles are usually operated at their third harmonic frequency.

The consideration of the curves shows that there are some areas of extremely high drive voltage requirements with the standard nozzle which are effectively useless not only because of the amplitude of the drives required but also because of the uncertainties of ink stream behavior at these high drives. An examination of the slope of standard nozzle curves ($dv/df$) shows that the slope values run from $-\infty$ to $+\infty$ (volts/kilohertz).

The response curve for a miniature nozzle is not nearly as extreme. Its slope lies between $-0.7$ and $+0.7$ (volts/kilohertz). Table 1 below illustrates this difference by showing the percent drive requirement change for a 5% increase in the velocity of sound in the ink. This change is a change which occurs after ink has been recycled for about 500 hours. Increase in the velocity of sound shifts the curves which are shown to the right by the percentage of change, here 5%. The voltage is shown below or obtained from the graph by locating the frequencies 5% apart.

| F1 (KHZ) | F2(KHZ) (F1×1.05) | V1 | V2 | STANDARD NOZZLE % Δ V | MINI NOZZLE % Δ V |
|---|---|---|---|---|---|
| 62 | 65 | 24 | 18.5 | −30 | |
| 62 | 65 | 19.5 | 18.5 | | −5 |
| 100 | 105 | 26 | 21 | −23 | |
| 100 | 105 | 34 | 35.5 | | −4.4 |
| 85 | 89 | 25 | 43 | +62 | |
| 85 | 89 | 27.5 | 29.5 | | +7 |

From the foregoing it can be seen that with the mininozzle, which is made in accordance with this invention, over an extremely wide range of frequencies, the percentage change in the drive voltage, required for the standard nozzle, is considerably greater than that required for the miniature nozzle made in accordance with this invention. Thus, such changes which are usually caused by variations in the parameters of the ink, are certainly far better tolerated by using the miniature nozzle than the standard nozzle.

It may be seen from the graph, that areas can be selected on the curves that would favor one nozzle over the other. For example, if 73 and 77 KHz were chosen the percentage change of the voltage drive would be substantially zero for the standard nozzle and 13% for the miniature nozzle. However it can be seen that the miniature nozzle can be used at any frequency from 50 KHz to 145 KHz while the standard nozzle has exclusion zones which shift with ink parameters.

Figure 2:
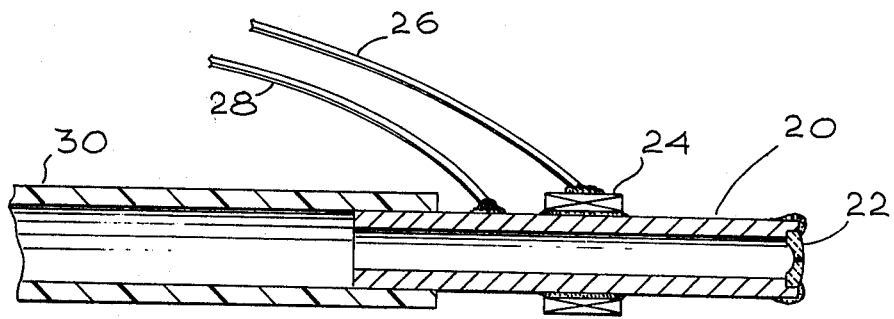
FIG. 2 is a cross sectional view of a nozzle made in accordance with this invention.

Referring to FIG. 2, there may be seen a cross sectional view of a miniature nozzle made in accordance with this invention. If desired, the nozzle 20 may be made from a short piece of hypodermic tubing. The front end of the nozzle is shaped to accept a 600μ OD jewel 22, which is inserted and staked in position. An epoxy seal is made. The orifice of the jewel, by way of example, and not to serve as a limitation on the invention, is 0.0025 inches. Further by way of illustration, the tubing dimensions are 0.028 inches OD and 0.017 inches ID. The length of the tubing is 0.180 inches. The frequency of operation selected for such a nozzle is below the frequency of first fluid resonance.

The transducer 24, is attached to the tubing, preferably in the manner described in application Ser. No. 420,769 to Keur et al, filing date Nov. 3, 1973, and assigned to a common assignee. One lead to the driving voltage source 26, is connected to the transducer 24, the other lead, which is the ground lead 28, is connected to the nozzle. A plastic hose 30, usually couples the nozzle to the ink reservoir.

The size of the standard nozzle may range from 0.591 inches to 0.975 inches which are used in frequencies on the order of 66 KHz.

To summarize, some of the advantages of a miniature nozzle in accordance with this invention, over that of the standard nozzle, are that since the mechanical resonance frequency of the miniature nozzle is well away from practical operating frequency, which is usually on the order of 66 KHz, rendering the response of the nozzle relatively flat with variations in both frequency and fluid (ink) parameters. Further, mechanical resonances of the nozzle are well above the practical operating frequencies. This also adds to the flatness of the frequency response to the nozzle. By flatness is meant that the voltage requirement for a particular drop separation time is substantially constant over a useful range of frequencies.

The ratio of diameters of this invention to those of the presently used nozzle is approximately 1:4 making the area ratio 1 to 17.

Because of the miniaturization of the nozzle conduit, the fluid velocities through this conduit are substantially increased and as a result, start up time is considerably shortened. This occurs because air or gas, which may be trapped in the conduit, is quickly swept out of it. To eliminate gases during start up time with the standard nozzle may take up to 5 minutes. Finally, the ink parameters need not be as tightly administered as heretofore in view of the flatness of the response curve.

The embodiments of the invention in which an exclusive property or privilege is claimed are defined as follows:

1. A nozzle for an ink drop writing system having a mechanical resonance frequency which is at least 1.5 times higher than the frequency of operation of the system and a fundamental fluid resonance frequency which is at least 1.06 times higher than the frequency of operation of the system.

2. A nozzle for an ink drop writing system as recited in claim 1 wherein its length is less than 2/10 of an inch.

3. A nozzle for an ink drop writing system as recited in claim 2 wherein its inner diameter is on the order of 0.017 inches.

4. A nozzle for an ink drop writing system as recited in claim 1 having a mechanical resonance frequency in excess of 100 KHz.

5. A nozzle for an ink drop writing system as recited in claim 4 wherein the inner diameter of said nozzle is selected to provide a minimal start up time for said ink drop writing system.

* * * * *